US012542712B2

(12) United States Patent
Chandrasekaran et al.

(10) Patent No.: US 12,542,712 B2
(45) Date of Patent: Feb. 3, 2026

(54) METHOD AND APPARATUS FOR NETWORK SLICING MANAGEMENT BY NETWORK SLICE SUBNET MANAGEMENT FUNCTION

(71) Applicant: Samsung Electronics Co., Ltd., Suwon-si (KR)

(72) Inventors: Ganesh Chandrasekaran, Bangalore (IN); Donghyeok Ho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/628,109

(22) Filed: Apr. 5, 2024

(65) Prior Publication Data
US 2024/0340219 A1    Oct. 10, 2024

Related U.S. Application Data

(63) Continuation of application No. PCT/KR2024/004359, filed on Apr. 3, 2024.

(30) Foreign Application Priority Data

Apr. 5, 2023  (IN) ............................. 202341025664
Dec. 22, 2023 (IN) ............................. 202341025664

(51) Int. Cl.
*H04L 41/0816* (2022.01)
*H04L 41/0895* (2022.01)
*H04L 41/5051* (2022.01)

(52) U.S. Cl.
CPC ...... *H04L 41/0816* (2013.01); *H04L 41/5051* (2013.01)

(58) Field of Classification Search
CPC ............. H04L 41/0816; H04L 41/5051; H04L 41/0895
See application file for complete search history.

(56) References Cited

U.S. PATENT DOCUMENTS 10,958,525 B2 *  3/2021  Fang ................... H04L 41/0895
10,986,540 B2 *  4/2021  Bor Yaliniz ........ H04L 41/5051
(Continued)

FOREIGN PATENT DOCUMENTS

CN        109218046        1/2019
CN        109429274        3/2019
(Continued)

OTHER PUBLICATIONS

Radiostud.Io Staff, "5G Network Slicing Choices in ONAP NSSMF Architecture," Radiostudio Next Generation Networks Use Case, Aarna Networks, Feb. 7, 2022. (Year: 2022).*
(Continued)

*Primary Examiner* — Alina A Boutah
(74) *Attorney, Agent, or Firm* — Nixon & Vanderhye, P.C.

(57) ABSTRACT

The present disclosure discloses a method and apparatus for network slicing management by slice subnet management function towards South Bound (SB) blocks. The method may comprise providing network slicing related information to South Bound, SB, blocks of the NSSMF to establish an interface between the NSSMF and the SB blocks; and
(Continued)

performing network slice management procedure towards the SB blocks through communication between the NSSMF and the SB blocks via the established interface.

20 Claims, 9 Drawing Sheets

(56) References Cited

U.S. PATENT DOCUMENTS

| | | | | |
|---|---|---|---|---|
| 2018/0317134 | A1* | 11/2018 | Leroux | H04W 28/26 |
| 2019/0021010 | A1 | 1/2019 | Senarath et al. | |
| 2019/0132218 | A1* | 5/2019 | Senarath | H04L 41/18 |
| 2020/0014608 | A1* | 1/2020 | Xu | H04L 41/5054 |
| 2020/0178167 | A1* | 6/2020 | Jia | H04W 8/08 |
| 2020/0235989 | A1 | 7/2020 | Sun et al. | |
| 2021/0185695 | A1 | 6/2021 | Gupta et al. | |
| 2023/0006884 | A1* | 1/2023 | IJntema | H04L 41/0681 |
| 2023/0031777 | A1* | 2/2023 | IJntema | H04L 41/0895 |
| 2023/0038522 | A1* | 2/2023 | Sim | H04L 45/76 |
| 2023/0328535 | A1* | 10/2023 | Trujillo | G06F 9/5072 370/328 |
| 2023/0388859 | A1* | 11/2023 | Bulakci | H04W 24/00 |

FOREIGN PATENT DOCUMENTS

| | | | | |
|---|---|---|---|---|
| CN | 109874143 | A * | 6/2019 | |
| CN | 108632063 | B * | 1/2021 | H04L 41/0813 |
| CN | 114553692 | | 5/2022 | |
| EP | 3668154 | B1 * | 10/2022 | H04B 7/0413 |
| WO | WO-2023177419 | A1 * | 9/2023 | H04L 41/0631 |

OTHER PUBLICATIONS

SO Developer Information, "E2E Network Slicing," London. (Year: 2025).*
Grace Petrucci, "5G Slicing: What, Why, How," ServiceNow Ccommunity > Products > Industry solutions > Telecommunications > Telecom articles > Enhancing the Mobile Ecosystem with 5G Slicing, Dec. 19, 2023. (Year: 2023).*
TechTarget and Informa Tech's Digital Businesses Combine, "What is a northbound interface/southboundinterface?." (Year: 2025).*
International Search Report and Written Opinion dated Jul. 3, 2024 in corresponding International Patent Application No. PCT/KR2024/004359.
3GPP; TSG SA; "Management and orchestration; Architecture framework (Release 17)," 3GPP TS 28.533 V17.3.0., Mar. 30, 2023, pp. 1-40.
Samsung and KDDI Complete 5G End-to-End Network Slicing Demonstration, https://news.samsung.com/global/samsung-and-kddi-complete-5g-end-to-end-network-slicing-demonstration, 4 pages, Sep. 23, 2020.
Samsung and KDDI Successfully Complete SLA Assurance Network Slicing Field Trial on a Live 5G Standalone Network, https://news.samsung.com/global/samsung-and-kddi-successfully-complete-sla-assurance-network-slicing-field-trial-on-a-live-5g-standalone-network, 2 pages, Jan. 20, 2023.

* cited by examiner

METHOD AND APPARATUS FOR NETWORK SLICING MANAGEMENT BY NETWORK SLICE SUBNET MANAGEMENT FUNCTION

CROSS-REFERENCE TO RELATED APPLICATIONS

This application is a continuation of International Application No. PCT/KR2024/004359 designating the United States, filed on Apr. 3, 2024, in the Korean Intellectual Property Receiving Office and claiming priority to Indian Provisional Patent Application No. 202341025664, filed on Apr. 5, 2023, in the Indian Patent Office, and to Indian Complete Patent Application No. 202341025664, filed on Dec. 22, 2023, in the Indian Patent Office, the disclosures of each of which are incorporated by reference herein in their entireties.

BACKGROUND

Field

The disclosure relates to wireless communication network. For example, the present disclosure relates to a method and apparatus for network slicing management by network slice subnet management function (NSSMF) entity towards South Bound (SB) blocks.

Description of Related Art

Network slicing may refer, for example, to a network configuration that allows multiple networks (virtualized and independent) to be created on top of a common physical infrastructure. For example, a network slice may be a logical network that contains one or more network slice subnets such as a Radio Access Network (RAN) slice subnet, transport network slice subnet, core network slice subnet and the like. A network slice controller manages the network slice and each request that arrives at the network slice. The Network Slicing Management Function (NSMF) is used to implement, orchestrate and manage the network slicing. The NSMF and Network Slice Subnet Management Function (NSSMF) are responsible for the end-to-end creation, management, and orchestration of network slice instance, network slice subnet instance, and managing the communication service and other network requirements in forming a slice. In the existing art, South Bound (SB) blocks of the NSSMF (e.g. Non-RT O-RAN) do not support any Application programming interface (API) to leverage the functional Network Slicing Management. Thus, the NSSMF has to take-up the entire role of slicing by interfacing with its SB blocks at a resource level management. Also, the load to the NSSMF is intensified because it has to collect individual FCAPS metric for all SB blocks for all resource level xNFs managed. Moreover, the existing SB blocks such as O-RAN/MANO/EMS/sub-NSSMF are slice unaware. The FCAPS is an acronym for the five working levels of network management: fault, configuration, accounting, performance and security.

Thus, in the existing art, the SB blocks such as O-RAN/MANO/EMS/sub-NSSMF are slice unaware. Further, the SB blocks only collect FCAPS metrics and correlate with the xNF level it manages. Also, the SB blocks are also unaware of Network Slice Subnet Instance (NSSI) and its respective xNF mapping. Moreover, the NSSMF can comprehend a large number of the SB blocks, and hence the load at NSSI level FCAPS correlation can be higher leading to slow SLA violation detection. In addition, current method only depicts the Network Service creation to its SB blocks leaving the correlation only at Network Service level and not NSSI level. Thus, there is a need for an improved NSSMF slice management method towards the South Bound blocks.

One or more shortcomings discussed above are addressed, and additional advantages and features are provided by the present disclosure. These and other aspects of the disclosure are described in detail herein and are considered a part of the disclosure.

SUMMARY

In an example embodiment of the present disclosure, a method of network slice management by a network slice subnet management function (NSSMF) in a communication network is disclosed. The method may comprise providing network slicing related information to South Bound (SB) blocks of the NSSMF to establish an interface between the NSSMF and the SB blocks; and performing network slice management procedure towards the SB blocks through communication between the NSSMF and the SB blocks via the established interface.

In an example embodiment of the present disclosure, the SB blocks comprises one or more of: Open Radio Access Network (O-RAN), Non-Real Time RAN Intelligent Controller (Non-RT RIC), Element Management System (EMS), Management and Orchestration (MANO), and sub-NSSMF.

In an embodiment of the present disclosure, the network slice management procedure is one or more of: create slice procedure, delete slice procedure, Service Level Agreement (SLA) management procedure, and notification management procedure.

In an example embodiment of the present disclosure, based on the network slice management procedure being the create slice procedure, providing the network slicing related information comprises: sending a create slice request comprising one or more of: slicesubnetId, callbackUri, authentication details, and sliceprofile to the SB block. The authentication details comprises an identifier and a password to receive token from the NSSMF. The sliceprofile comprises an identifier of slice profile and a list of PLMNInfo data type.

In an example embodiment of the present disclosure, based on the network slice management procedure being the delete slice procedure to delete a slice, providing the network slicing related information comprises: sending a delete slice request comprising a slice identifier (sliceId) of the slice to be deleted to the SB block.

In an example embodiment of the present disclosure, based on the network slice management procedure being the SLA management procedure, providing the network slicing related information comprises: sending at least one of: sliceProfileId, a list of SLA configurations, a list of target NR Cell Global Identifier (NGCIs), name of SLA to the SB block.

In an example embodiment of the present disclosure, the SLA management procedure comprises one or more of: configure SLA, de-configure SLA, obtain individual SLA Configuration, list all SLA Configuration, update all SLA Configuration, Update Specific SLA Configuration, and obtain status of Configuration Request.

In an example embodiment of the present disclosure, based on the network slice management procedure being the notification management procedure, the method comprises: receiving at least one of: changed configuration information and SLA measurement information from the SB block.

In an example embodiment of the present disclosure, an apparatus for a network slice subnet management function (NSSMF) in a communication network, is disclosed. The apparatus may comprise: at least one processor, comprising processing circuitry, and a memory storing instructions to be executed by the at least one processor. The instructions, when executed by the at least one processor, cause the apparatus to perform operations. The operations may comprises providing network slicing related information to South Bound (SB) blocks of the NSSMF to establish an interface between the NSSMF and the SB blocks; and performing network slice management procedure towards the SB blocks through communication between the NSSMF and the SB blocks via the established interface In an example embodiment of the present disclosure, a non-transitory computer readable storage medium storing instructions is disclosed. The instructions which, when executed by at least one processor of an apparatus for a network slice subnet management function (NSSMF) in a communication network, cause the apparatus to perform operations. The operations may comprises providing network slicing related information to South Bound (SB) blocks of the NSSMF to establish an interface between the NSSMF and the SB blocks; and performing network slice management procedure towards the SB blocks through communication between the NSSMF and the SB blocks via the established interface.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The above and other aspects, features and advantages of certain embodiments of the present disclosure will be more apparent from the following detailed description, taken in conjunction with the accompanying drawings in which.

Figure 1:
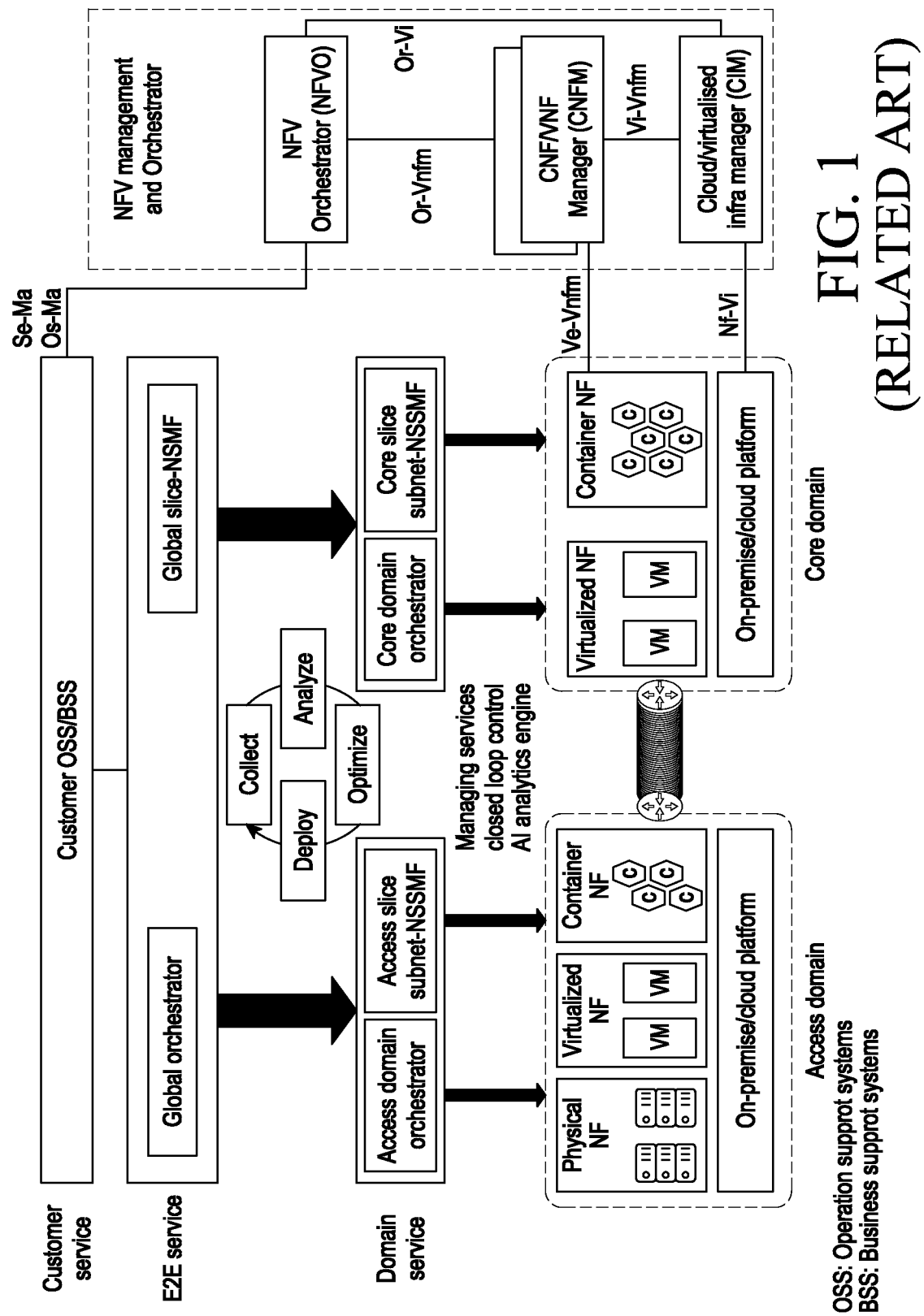
FIG. 1 is a diagram illustrating an orchestration tier in telecom in accordance with existing techniques.

The block diagrams herein represent conceptual views of the illustrative systems. Similarly, any flowcharts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

Reference will now be made to various example embodiments and specific language will be used to describe the same. It will nevertheless be understood that no limitation of the scope of the disclosure is thereby intended, such alterations and further modifications in the illustrated system, and such further applications of the principles of the disclosure as illustrated therein being contemplated as would normally occur to one skilled in the art to which the disclosure relates.

It will be understood by those skilled in the art that the foregoing general description and the following detailed description are explanatory of the disclosure and are not intended to be restrictive thereof.

In the present disclosure, the word "exemplary" may refer, for example, to "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, various example embodiments thereof are shown by way of example in the drawings and will be described in greater detail below. It should be understood, however that it is not intended to limit the disclosure to the particular forms disclosed, but on the contrary, the disclosure is intended to cover all modifications, equivalents, and alternative falling within the spirit and the scope of the disclosure.

The terms "comprises", "comprising", or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a device or system or apparatus proceeded by "comprises . . . a" does not, without more constraints, preclude the existence of other elements or additional elements in the device or system or apparatus.

The terms like "at least one" and "one or more" may be used interchangeably throughout the description. In the following detailed description of various example embodiments of the disclosure, reference is made to the accompanying drawings that form a part hereof, and in which are shown by way of illustration various embodiments in which the disclosure may be practiced. The following description is, therefore, not to be taken in a limiting sense. In the following description, well known functions or constructions are not described in detail since they would obscure the description with unnecessary detail.

FIG. 1 is a diagram illustrating an orchestration tier in telecom in accordance with existing techniques. The orchestration tier in FIG. 1 provides a vendor-agnostic solution for Network Automation across physical, virtual and container networks and is capable of creating Network Slice, Service Level Agreement (SLA), Network Health monitoring, etc.

Figure 2:
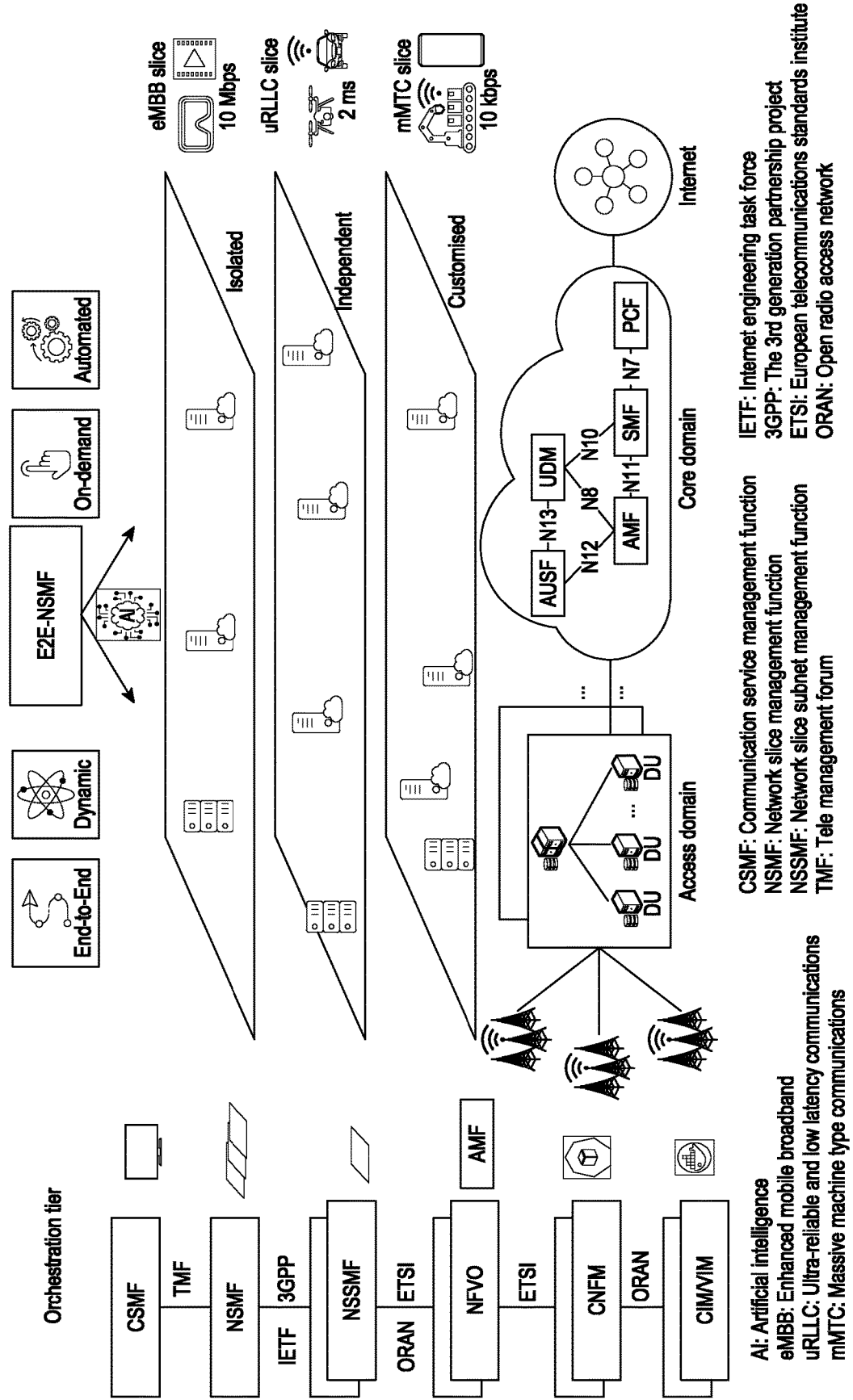
FIG. 2 is a diagram illustrating network slicing in the telecom, in accordance with existing techniques.
Figure 3:
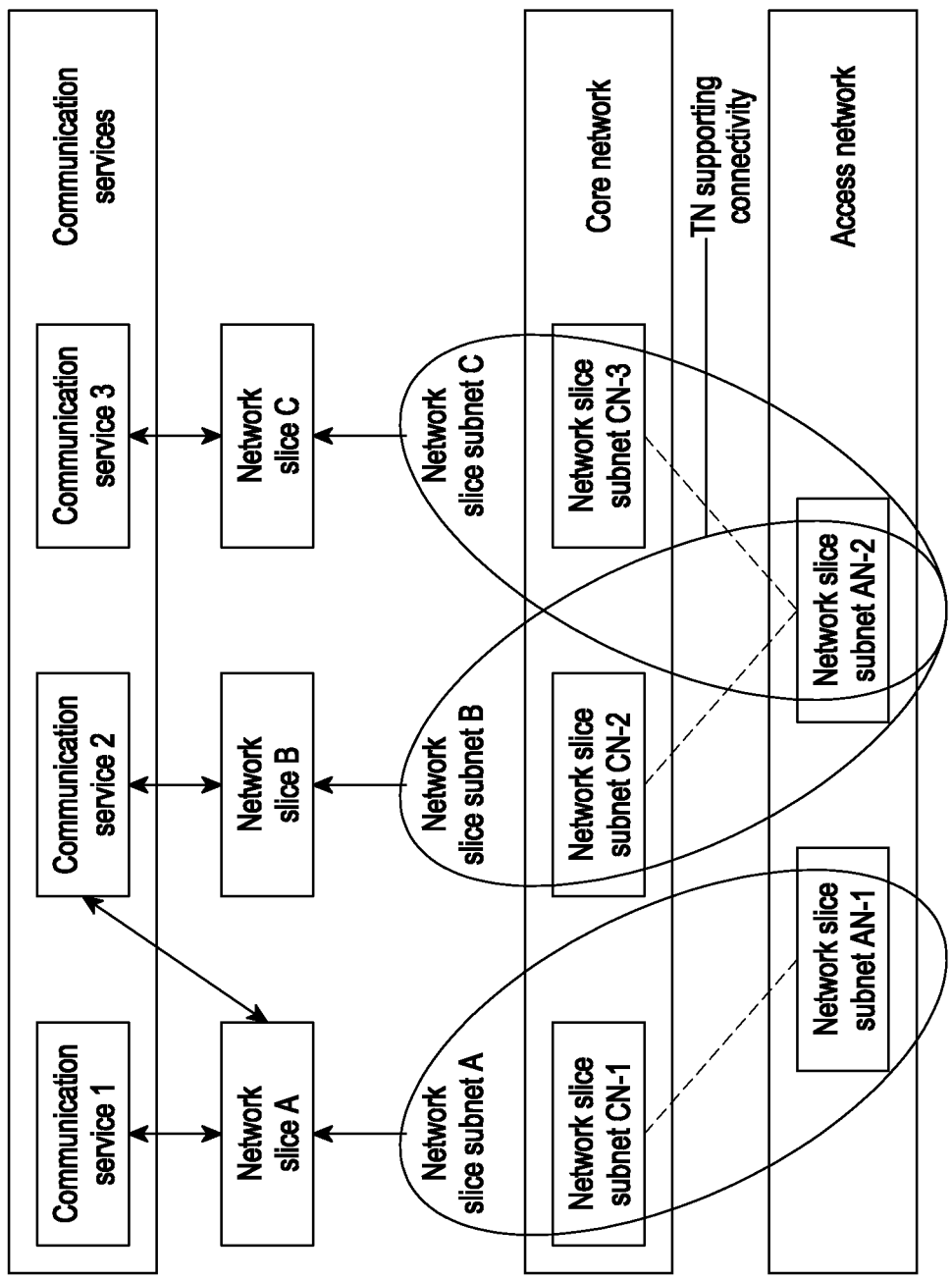
FIG. 3 is a diagram illustrating computing in a communication network, in accordance with existing techniques.

FIG. 2 is a diagram illustrating network slicing in the telecom, in accordance with existing techniques. FIG. 3 is a diagram illustrating computing in a communication network, in accordance with existing techniques. A Network Slice Instance (NSI) may include none, one, or more NSSIs, which may be shared by another NSI. Similarly, the NSSI is formed of a set of Network Functions (NFs), which can be either VNFs or PNFs. Also, the NSI is a set of NFs and network slice subnet instance (NSSIs) that combined together can support a certain set of communication services. A set of Network Function instances and the required resources (e.g. compute, storage and networking resources) which form a deployed Network Slice. The NSI ID is an identifier for identifying the Core Network part of a Network Slice instance when multiple Network Slice instances of the same Network Slice are deployed, and there is a need to differentiate between them in the 5GC. A Managed Object Instance (MOI) of NetworkSlice IOC. The NetworkSlice instance represents service view of a network slice which exposes the root NetworkSliceSubnet instance.

Network slice subnet instance (NSSI) is introduced for NSI management. The NSSI is a subset of NSI and can be a combination of one or more NFs within a particular domain. The NSI may comprise multiple NSSIs across different domains, like a radio access network (RAN) and core network domains, but not limited thereto. The RAN domain may have multiple NSSIs in standalone (e.g., NSSI-a or NSSI-b). Similarly, the core network domain may also have multiple NSSIs (e.g., NSSI-c, NSSI-d, etc.). The NSI may be achieved by logically combining the NSSI's from different domains together, NSI-1 may be achieved by combining the NSSI-a and NSSI-c. Similarly, NSI-3 may be achieved by combining the NSSI's NSSI-E and NSSI-B together. The NSSI may contain only a core network function or only an access network function or multiple network functions within the same domain as shown in FIG. 3. The network slice subnet is a representation of a set of network functions and the associated resources (e.g. compute, storage and networking resources) supporting network slice. The NetworkSliceSubnet IOC (refer to TS 28.541) is used to model network slice subnet which may include core network functions and/or RAN network functions and/or other network slice subnets. The network slice instance defined in TS 23.501 can be reflected via the NetworkSliceSubnet IOC and the allocated resources. The NetworkSliceSubnet instance is represented as A Managed Object Instance (MOI) of NetworkSliceSubnet IOC.

In various embodiments, two NSIs can be physically/logically isolated from each other either fully or partially. In an embodiment, two or more NSIs may share a common NSSF. This may also be referred to as a shared constituent of NSI. In various embodiments, two or more NSSIs may share a common network function (NF). This is also called a shared constituent of NSSF.

A communication service typically uses one NSI. The network slice controller may be defined as a network orchestrator, which interfaces with various functionalities performed by each layer to coherently manage each slice request. The communication service may include a bundle of specific services, such as voice service, data service, uRLLC service, and so on. Each of the services should be realized/served by different PDU sessions. Also, a specific PDU session makes use of a single network slice, and different PDU sessions may belong to different network slices.

The network slice may refer, for example, to a logical network that provides specific network capabilities and network characteristics. Network Slice Information Object Class (IOC) (refer to TS 28.541) is used to model the network slice. The network slice defined in TS 23.501 is represented with added service properties. Further, an S-NSSAI identifies a Network Slice. Further, the S-NSSAI is comprised of a Slice/Service type (SST), which refers to the expected Network Slice behaviour in terms of features and services; and a Slice Differentiator (SD), which is optional information that complements the Slice/Service type(s) to differentiate amongst multiple Network Slices of the same Slice/Service type. Further, a Service Level Specification (SLS) is a set of service level requirements associated with a Service Level Agreement (SLA) to be satisfied by a network slice.

The present disclosure discloses a system and method for network slicing management by slice subnet management function towards South Bound (SB) blocks. The present disclosure describes NSSMF Slice management procedure towards the SB blocks. The slice management procedure may comprise one or more of following, but not limited to: create slice, delete slice, slice SLA management and notification management. The NSSMF connects to the one or more SB blocks to perform the above-mentioned lifecycle operation. Further, the NSSMF creates the slicesubnetId along with sliceProfile before sharing it with its SB blocks. Each SB block can then create the relation between its xNFs and its respective NSSI (slicesubnetId). Based on which FCAPS correlation and slice-SLA feedback is generated at the SB-block level and violation is detected at NSSMF. Hence, method of interfacing decreases the time for SLA violation detection and distributes the load to SB-blocks rather than central subnet-level NSSMF level processing.

Figure 4:
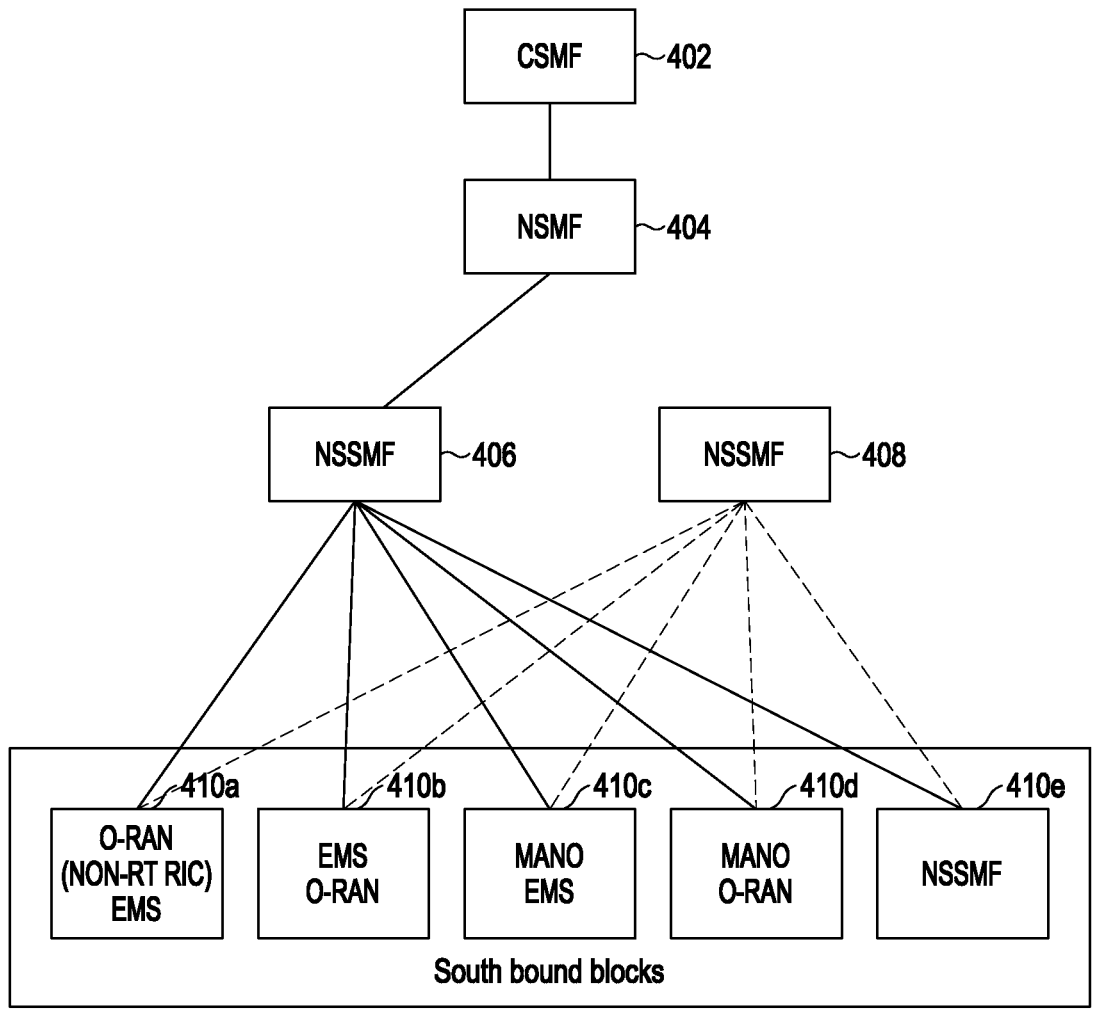
FIG. 4 is a diagram illustrating an example configuration of a communication network according to various embodiments.

FIG. 4 is a diagram illustrating an example configuration of a communication network according to various embodiments. The communication network comprises a Communication Service Management Function (CSMF) 402 and a Network Slice Management Function (NSMF) 404. The NSMF 404 further manages Network Slice subnet Management Function (NSSMF) 406 and NSSMF 408 which connect to the one or more SB blocks 410*a*, 410*b*, 410*c*, 410*d*, 410*e* to perform the above-mentioned lifecycle operation. The SB blocks may include one or more of following, but not limited to, O-RAN: Open Radio Access Network, Non-RT RIC: Non-RealTime RIC RAN Intelligent Controller, EMS: Element Management System, MANO: Management and Orchestration, a sub-NSSMF. The NSSMF south bound interfacing is essential for the SB blocks to map the relation between various network functions (xNFs) to slice. Without SB block able to map the relation between xNFs and NSS it cannot do any correlation of metrics at slice-subnet level. This intensifies the load to the NSSMF, where the NSSMF has to collect individual FCAPS metric for all the SB blocks for all the xNFs managed. The xNF may be one of CNF, VNF, PNF deployed in 5G/6G Access or Core domain. Each of the functions may include various circuitry and/or executable program instructions.

The interfacing of the SB blocks decreases time for SLA violation detection and distributes the load to the SB blocks rather than central subnet-level NSSMF level processing. In an example, the NSSMF may create the slicesubnetId along with sliceProfile before sharing it with the SB blocks. Each SB block may create the relation between its xNFs and its respective NSSI (slicesubnetId). Based on which, the FCAPS correlation and slice-SLA feedback may be generated at the SB-block level and violation is detected at the NSSMF.

Figure 5:
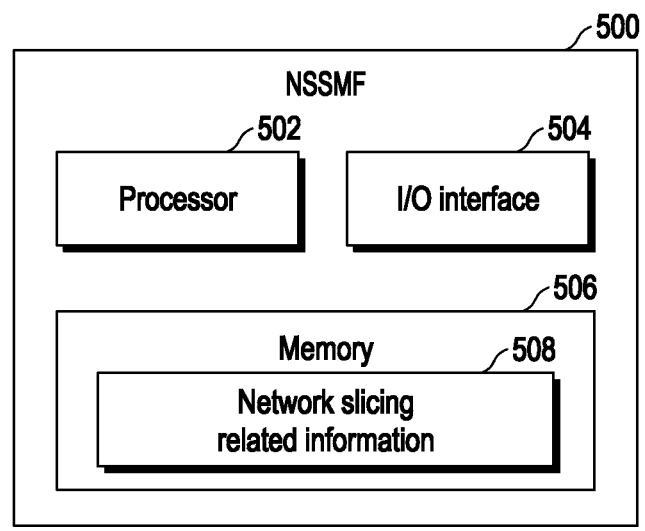
FIG. 5 is a block diagram illustrating an example configuration of a network slice subnet management function (NSSMF) for network slice management in a communication network according to various embodiments.

FIG. 5 is a block diagram illustrating an example configuration of a network slice subnet management function (NSSMF) 500 for network slice management in a communication network according to various embodiments. The 500 may comprise processor (e.g., including processing circuitry) 502, I/O interface (e.g., including interface circuitry) 504 and memory 506. The I/O interface 504 may be configured to send and receive data from the SB blocks and NSMF. The memory 506 may be communicatively coupled to the at least one processor 502 and may store one or more instructions executable by the processor 502. The memory 506 may also store network slicing related information. The at least one processor 502 may be configured to perform one or more functions of the NSSMF 500 as described in the present disclosure.

In an embodiment, the processor 502 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The processor 502 may, for example, create an interface between the NSSMF and South Bound (SB) blocks by providing network slicing related information to South Bound (SB) blocks of the NSSMF. The processor 502 may cause network communication from the NSSMF to the SB blocks via the created interface to implement network slice management procedure towards the SB block. In other words, the processor 502 may provide network slicing related information to the South Bound (SB) blocks of the NSSMF 500 for establishing the interface e.g., an application programmable interface (API), between the NSSMF 500 and the SB blocks 410 to enable implementation of network slice management procedure towards the SB blocks 410. The network slice management procedure may be one or more of: create slice procedure, delete slice procedure, Service Level Agreement (SLA) management procedure, and notification management procedure, but not limited thereto. The detailed working of the NSSMF 500 for each network slice management procedure has now been explained in conjunction with FIG. 6-8.

Figure 6:
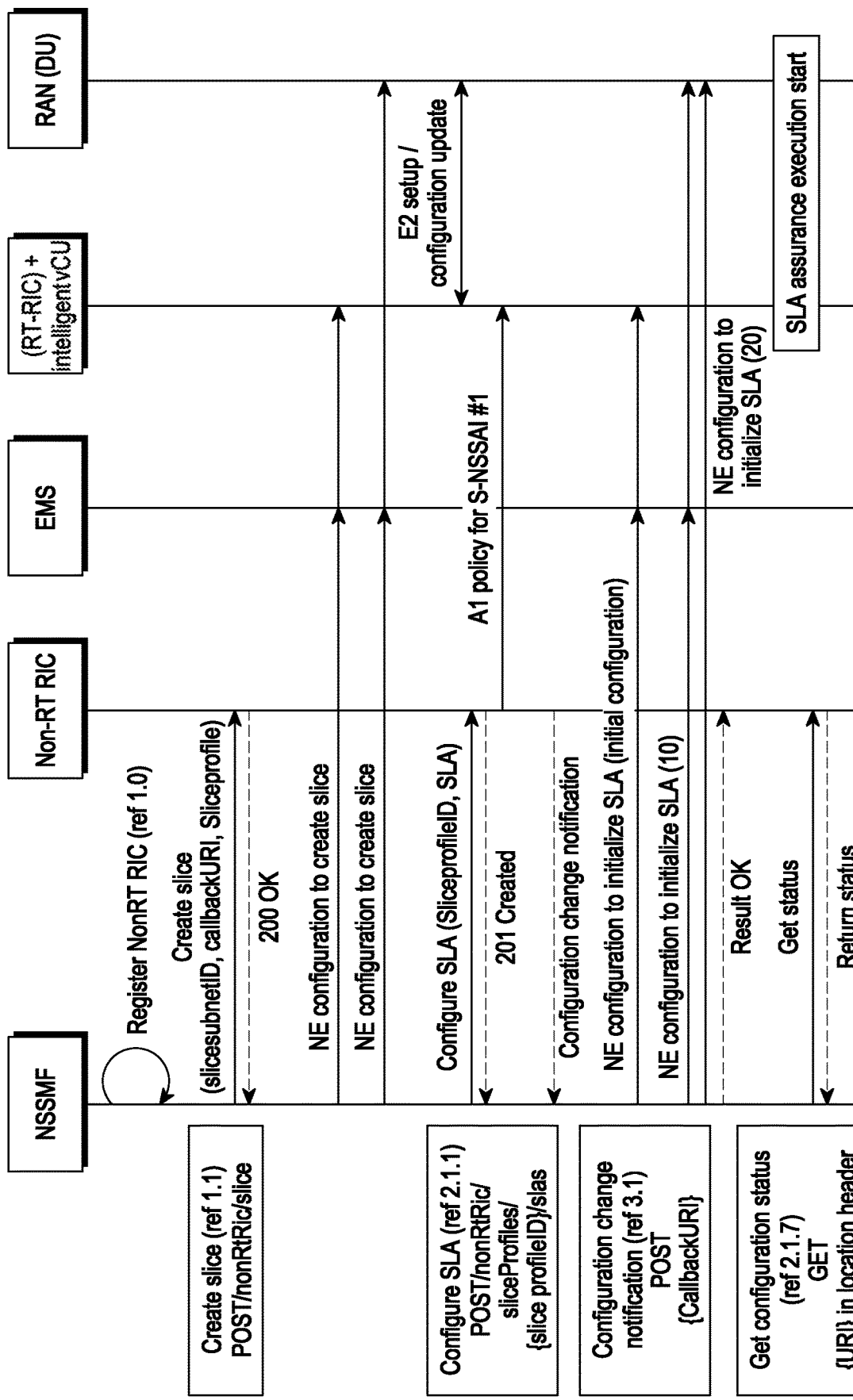
FIG. 6 is a signal flow diagram illustrating an example network slice management procedure according to various embodiments.

FIG. 6 is a signal flow diagram illustrating an example network slice management procedure including slice creation and slice configuration management procedure, according to various embodiments. A slice is created by the NSSMF. For the slice creation, the NSSMF may transmit a request to Non-RT RIC using "CreateSlice" request. The "CreateSlice" request may comprise various parameters such as: slicesubnetId, callbackUri, authentication details, and sliceprofile, but not limited thereto, to the Non-RT RIC for the creation of the slice. In an embodiment, the authentication details may comprise an identifier and a password to receive token from the NSSMF. In an embodiment, the sliceprofile comprises an identifier of slice profile and a list of PLMNInfo data type. Further, the Non-RT RIC may confirm the creation of the slice. Upon the confirmation, the NSSMF may transmit an NE configuration message to EMS, RT-RIC and intelligent vCU for creation of slice. The NSSMF may transmit the NE configuration message and E2 setup/configuration update message to RAN for creation of slice. Once the slice has been successfully created, the NSSMF may perform an SLA configuration. The NSSMF initial communicates with Non-RTRIC by transmitting configure SLA message along with SliceProfileID and SLA details. Once, the SLA is created, the Non-RT RIC may transmit an A1 Policy for S-NSSAI #1 to (RT-RIC)+intelligent vCU. Furthermore, if a configuration change message is received by the Non-RT RIC, then the NSSMF may transmit a NE configuration message to (RT-RIC)+Intelligent VCU and RAN during the initialization of the SLA. Thereafter, the SLA assurance execution process started. The NSSMF may retrieve the configuration status by transmitting a Get status message to Non-RT RIC. The Non-RT RIC may provide the configuration status to the NSSMF. The Non-RT RIC Registration information May be represented as shown in below Table. 1.

TABLE 1

| | Operations | Reference | URI | Triggers |
|---|---|---|---|---|
| | Create Slice | 1.1 | {apiRoot}/nonRtRic/slice | NSSMF |
| | Delete Slice | 1.2 | {apiRoot}/nonRtRic/slice/{sliceId} | NSSMF |
| SLA Management | Configure SLA | 2.1.1 | {apiRoot}/nonRtRic/sliceProfiles/{sliceProfileId}/slas | NSSMF |
| | De-configure specific SLA | 2.1.2 | {apiRoot}/nonRtRic/sliceProfiles/{sliceProfileId}/slas/{slaName} | NSSMF |
| | Get Individual SLA configuration | 2.1.3 | {apiRoot}/nonRtRic/sliceProfiles/{sliceProfileId}/slas/{slaName} | NSSMF |
| | List all SLA configuration of specific sliceProfile | 2.1.4 | {apiRoot}/nonRtRic/sliceProfiles/{sliceProfileId}/slas | NSSMF |
| | Change ALL SLA settings of the sliceProfile | 2.1.5 | {apiRoot}/nonRtRic/sliceProfiles/{sliceProfileId}/slas | NSSMF |
| | Changing SPECIFIC SLA values | 2.1.6 | {apiRoot}/nonRtRic/sliceProfiles/{sliceProfileId}/slas | NSSMF |
| | Get configuration status | 2.1.7 | URI provided as Location in POST, PUT, and PATCH responses | NSSMF |

TABLE 1-continued

| Operations | Reference | URI | Triggers |
|---|---|---|---|
| Configuration Change Notification | 3.1 | {CallbackURI} in create slice | Non-RT RIC |
| SLA Feedback Notification | 4.1 | {CallbackURI} in create slice | Non-RT RIC |

The message format for creation of network slice ID transmitted by the NSSMF to the Non-RT RIC may be as shown in below Table 2

TABLE 2

| URI | Method | Description |
|---|---|---|
| {apiRoot}/nonRtRic/slice | POST | create slice |

The request body and response body during the creation of slice may be as shown in below table 3 and table 4 respectively.

TABLE 3

| Name | Cardinality | Description |
|---|---|---|
| slicesubnetId | 1 | Identifier of slice subnet id (UUID) |
| callbackUri | 1 | Reporting URI of SLA measurement (SLA Feedback) |
| Authentication | 1 | -- Inline |
| > username | 1 | ID to receive token from NSSMF (plain text) |
| > password | 1 | Password to receive token from NSSMF (plain text) |
| sliceProfiles | 0 . . . N | -- Inline |
| > sliceProfileId | 1 | Identifier of slice profile (UUID) |
| > pLMNInfoList | 1 . . . N | -- Inline |
| >> pLMNId | 1 | plmn id, {MCC}-{MNC}, e.g., 440-51 |
| >> sNSSAI | 1 | Snssai, {SST}-{SD}, e.g., 255-16CDE0 |

TABLE 4

| Data Type | Response Codes | Description |
|---|---|---|
| n/a | 200 OK | If the request is successful, return the HTTP Response Code of 200 |
| ProblemDetails | 4xx/5xx | If it fails, the reason for failure and the corresponding code are returned. |

In an embodiment, the network slice management procedure may be the delete slice procedure to delete a slice. The NSSMF may send a delete slice request comprising a slice identifier (sliceId) of the slice to be deleted to the SB block (Non-RT RIC). The URI format, request body and response body for deletion of slice ID by NSSMF may be as shown in below table 5, table 6 and table 7 respectively.

TABLE 5

| URI | Method | Description |
|---|---|---|
| {apiRoot}/nonRtRic/slice/{sliceId} | DELETE | delete slice |

TABLE 6

| Name | Data type | Cardinality | Description |
|---|---|---|---|
| sliceId | String | 1 | Identifier of slice |

TABLE 7

| Data type | Cardinality | Response Code | Description |
|---|---|---|---|
| n/a | 1 | 204 NoContent | Shall be returned when the reporting is accepted. |

In an embodiment, the network slice management procedure may be the SLA management procedure. The NSSMF may sending at least one of: sliceProfileId, a list of SLA configurations, a list of target NR Cell Global Identifier (NGCIs), name of SLA, but not limited thereto, to the SB block. In an embodiment, the SLA management procedure may comprise one or more of: configure SLA, de-configure SLA, obtain individual SLA Configuration, list all SLA Configuration, update all SLA Configuration, Update Specific SLA Configuration, and obtain status of Configuration Request, but not limited thereto.

Figure 7:
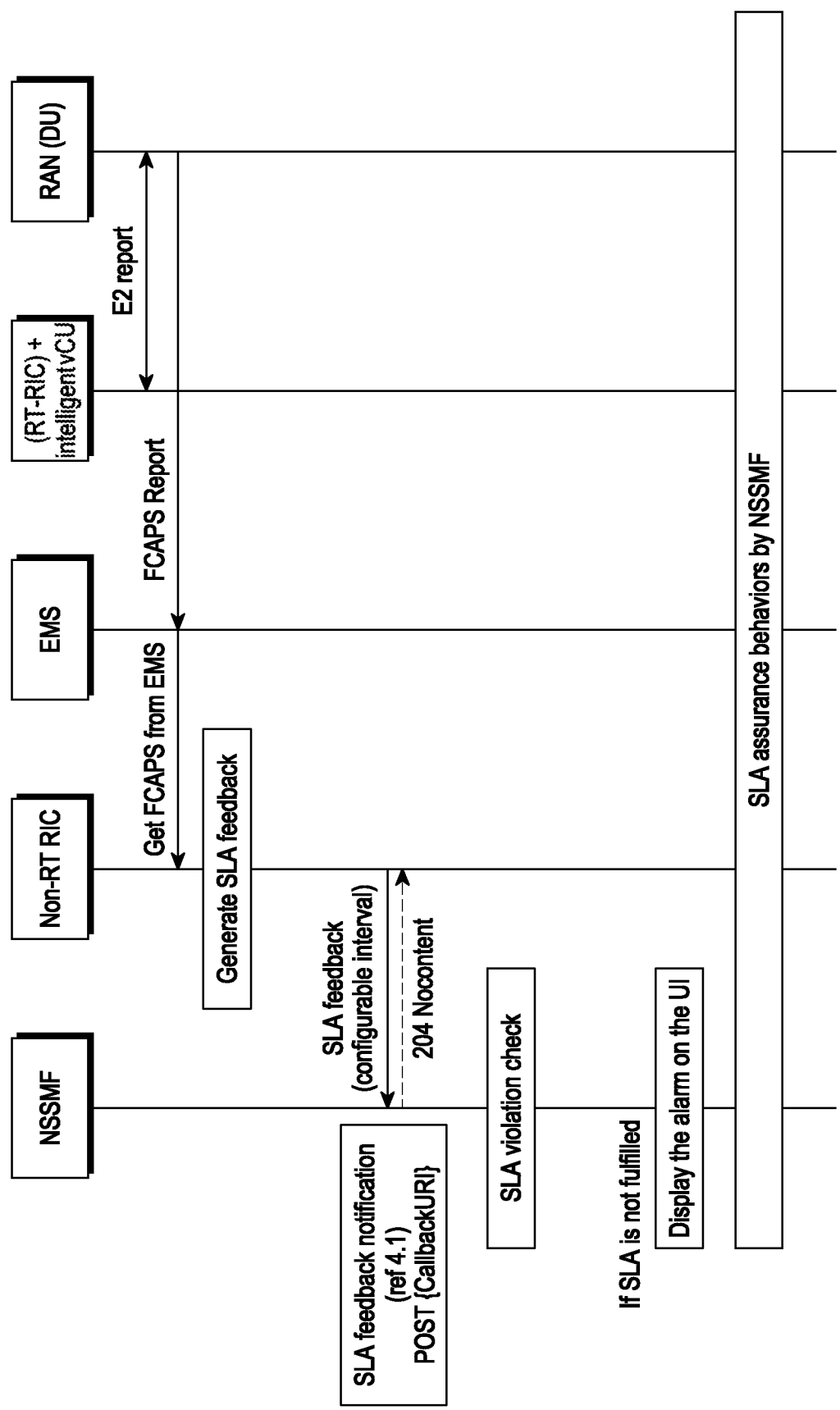
FIG. 7 is a signal flow diagram illustrating example slice SLA level correlation at the SB-block level according to various embodiments.

FIG. 7 is a signal flow diagram illustrating example slice SLA level correlation at the SB-block level, according to various embodiments. The SB block (the Non-RT RIC) may generate an SLA feedback based on the E2 report and FCAPS report transmitted from the RAN. The FCAPS report may also received by the Non-RT RIC from the EMS. Upon receiving, the reports, the Non-RT RIC may generate the SLA feedback. Upon the generation, the Non-RT RIC may provide a notification regarding the generated SLA feedback to the NSSMF. Further, the NSSMF may perform a SLA violation check. If the SLA is not fulfilled, then the NSSMF may display the alarm on a user interface. Also, the NSSMF may notify the SLA assurance behaviours to the Non-RT RIC, EMS, (RT-RIC)+Intelligent VCU, and RAN (DU).

Figure 8:
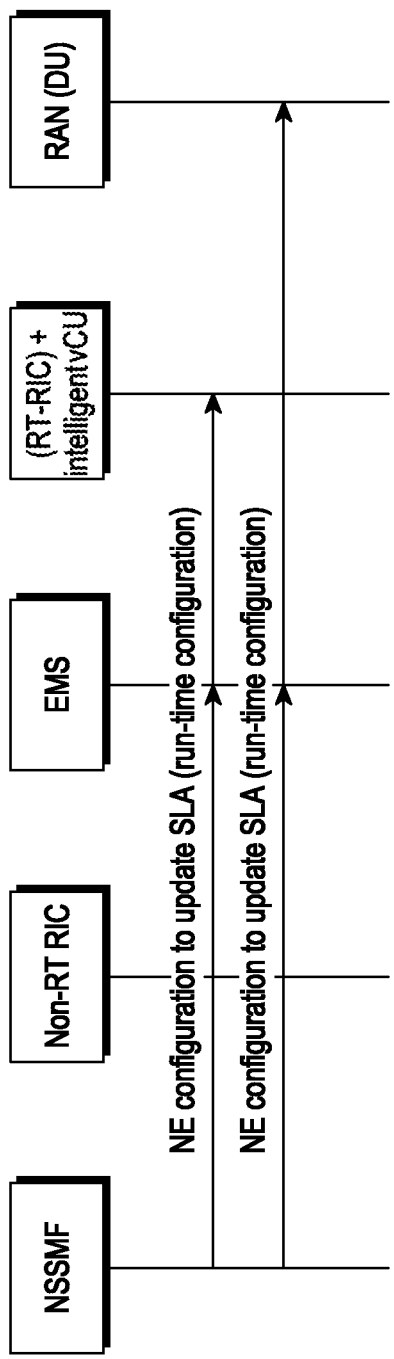
FIG. 8 is a signal flow diagram illustrating an example SLA configuration update procedure according to various embodiments.

FIG. 8 is a signal flow diagram illustrating an example SLA configuration update procedure, according to various embodiments. During the SLA configuration update process as represented in FIG. 7, initially the NSSMF may describe NSSI SLA assurance behaviours. Further, the NSSMF may describe the NE configuration to update SLA during manual run-time configuration. Thereafter, the NSSMF may describes the NE configuration to update SLA during the event-driven run-time configuration by respective SB-block.

The Uniform Resource Identifier (URI) format, request parameter, request body, and response body for configuration of the SLA for specific network slice by the NSSMF are shown in below tables 8A, 8B, 8C and 8D respectively.

TABLE 8A

| URI | Method | Description |
| --- | --- | --- |
| {apiRoot}/nonRtRic/sliceProfiles/{sliceProfileId}/slas | POST | configure SLA |

TABLE 8B

| Name | Data type | Cardinality | Description |
| --- | --- | --- | --- |
| sliceProfileId | String | 1 | Identifier of slice profile(UUID) |

TABLE 8C

| Data type | Cardinality | Description |
| --- | --- | --- |
| SLA | 1...N | list of SLA configurations |
| DU | 1...N | |
| > NE ID | 1 | NE ID |
| > Near-RT RIC (IPaddr) | 1 | |
| > NR Cell Global IDs | 1...N | list of target NGCIs. When this value is empty list, all cells in designated DU are targeted. |

TABLE 8D

| Data type | Cardinality | Response Code | Description |
| --- | --- | --- | --- |
| SLA | 1...N | 201 Created | list of SLA configurations The HTTP response MUST include a "Location" HTTP header that contains the resource URI of the created SLA |
| ProblemDetails | | 4xx/5xx | If it fails, the reason for failure and the corresponding code are returned. |

In an embodiment, when the SLA management procedure may include the de-configure SLA, the NSSMF may send a request to delete that SLA. Tables 9A, 9B and 9C show the URI format, request body, and response body for deletion of specific SLA, respectively.

TABLE 9A

| URI | Method | Description |
| --- | --- | --- |
| {apiRoot}/nonRtRic/sliceProfiles/{sliceProfileId}/slas/{slaName} | DELETE | delete specific SLA |

TABLE 9B

| Name | Data type | Cardinality | Description |
| --- | --- | --- | --- |
| sliceProfileId | String | 1 | Identifier of slice profile(UUID) |
| slaName | String | 1 | name of specific sla |

TABLE 9C

| Data type | Cardinality | Response Code | Description |
| --- | --- | --- | --- |
| n/a | 1 | 204 NoContent | Shall be returned when the individual sla resource has been deleted successfully. |
| ProblemDetails | | 4xx/5xx | If it fails, the reason for failure and the corresponding code are returned. |

In an embodiment, the SLA management procedure may obtain individual SLA Configuration. The NSSMF may request for the individual SLA configuration. The URI format, request body and response body to get individual SLA configuration may be as shown in table 10A, 10B and 10C.

TABLE 10A

| URI | Method | Description |
| --- | --- | --- |
| {apiRoot}/nonRtRic/sliceProfiles/{sliceProfileId}/slas/{slaName} | GET | Get Individual SLA configuration |

TABLE 10B

| Name | Data type | Cardinality | Description |
| --- | --- | --- | --- |
| sliceProfileId | String | 1 | Identifier of slice profile(UUID) |
| slaName | String | 1 | name of specific sla |

TABLE 10C

| Data type | Cardinality | Response Code | Description |
| --- | --- | --- | --- |
| SLA | 1 | 200 OK | Return individual SLA configuration |
| ProblemDetails | | 4xx/5xx | If it fails, the reason for failure and the corresponding code are returned. |

In an embodiment, the SLA management procedure may obtain a list of all SLA Configuration. In this, the NSSMF may request for the list of all SLA Configuration. The URI format, request body and response body to list all SLA configuration of specific slice profile may be as shown in below tables 11A, 11B, 11C.

TABLE 11A

| URI | Method | Description |
|---|---|---|
| {apiRoot}/nonRtRic/sliceProfiles/{sliceProfileId}/slas | GET | List all SLA configuration of specific sliceProfile |

TABLE 11B

| Name | Data type | Cardinality | Description |
|---|---|---|---|
| sliceProfileId | String | 1 | Identifier of slice profile(UUID) |

TABLE 11C

| Data type | Cardinality | Response Code | Description |
|---|---|---|---|
| SLA | 0...N | 200 OK | Returns all SLA information in the sliceProfile. |
| ProblemDetails | | 4xx/5xx | If it fails, the reason for failure and the corresponding code are returned. |

In an embodiment, the SLA management procedure may update all SLA Configuration. The URI format, request parameter, request body and response body to change all SLA configuration of the sliceProfile is as shown in below tables 12A, 12B, 12C and 12D.

TABLE 12A

| URI | Method | Description |
|---|---|---|
| {apiRoot}/nonRtRic/sliceProfiles/{sliceProfileId}/slas | PUT | Change ALL SLA configuration of the sliceProfile |

TABLE 12B

| Name | Data type | Cardinality | Description |
|---|---|---|---|
| sliceProfileId | String | 1 | Identifier of slice profile(UUID) |

TABLE 12C

| Data type | Cardinality | Description |
|---|---|---|
| SLA | 1...N | list of SLA configurations |
| DU | 1...N | |
| > NE ID | 1 | NE ID |
| > Near-RT RIC (IPaddr) | 1 | |
| > NR Cell Global IDs | 1...N | list of target NGCIs. When this value is empty list, all cells in designated DU are targeted. |

TABLE 12D

| Data type | Cardinality | Response Code | Description |
|---|---|---|---|
| SLA | 1...N | 201 Created | list of SLA configurations The HTTP response MUST include a "Location" HTTP header that contains the resource URI of the created SLA |
| ProblemDetails | | 4xx/5xx | If it fails, the reason for failure and the corresponding code are returned. |

In an embodiment, the SLA management procedure may Update Specific SLA Configuration. The URI request, request parameter, request body and response body to change specific SLA configuration of the sliceProfile may be as shown below in tables 13A, 13B, 13C and 13D.

TABLE 13A

| URI | Method | Description |
|---|---|---|
| {apiRoot}/nonRtRic/sliceProfiles/{sliceProfileId}/slas | PATCH | Changing SPECIFIC SLA configuration of the sliceProfile |

TABLE 13B

| Name | Data type | Cardinality | Description |
|---|---|---|---|
| sliceProfileId | String | 1 | Identifier of slice profile(UUID) |

TABLE 13C

| Data type | Cardinality | Description |
|---|---|---|
| SLA | 1...N | list of SLA configurations |

TABLE 13D

| Data type | Cardinality | Response Code | Description |
|---|---|---|---|
| SLA | 1 ... N | 201 Created | list of SLA configurations. The HTTP response MUST include a "Location" HTTP header that contains the resource URI of the created SLA |
| ProblemDetails | | 4xx/5xx | If it fails, the reason for failure and the corresponding code are returned. | obtain status of Configuration Request. The URI request and response body to retrieve the progress of the SLA creation and modification request may be as shown in tables 14A and 14B.

TABLE 14A

| URI | Method | Description |
|---|---|---|
| URI provided as Location in POST, PUT, and PATCH responses | GET | Retrieve the progress of the SLA creation and modification request. |

TABLE 14B

| Data type | Cardinality | Response Code | Description |
|---|---|---|---|
| STATUS | 1 | 200 OK | Returns the progress status of the SLA creation and modification request. |

In an embodiment, when the network slice management procedure includes the notification management procedure, the NSSMF may receive at least one of: changed configuration information and SLA measurement information from the SB block, but not limited thereto. The URI parameter, request body, response body to update configuration parameter may be as shown in below tables 15.A. 15B and 15C.

TABLE 15A

| URI | Method | Description |
|---|---|---|
| URI provided in slice ID creation | POST | Transmits the changed config value to the list to the presented callbackuri |

TABLE 15B

| Data type | Cardinality | Description |
|---|---|---|
| configurationChangeNotification | 1 | Changed configuration information |

TABLE 15C

| Data type | Cardinality | Response Code | Description |
|---|---|---|---|
| n/a | 1 | 204 NoContent | Shall be returned when the reporting is accepted. |

The URI format, request body and response body to report SLA may be as shown in below tables 16A, 16B and 16C.

TABLE 16A

| URI | Method | Description |
|---|---|---|
| URI provided in slice ID creation | POST | Transmitting performance information to the presented callbackuri |

TABLE 16B

| Data type | Cardinality | Description |
|---|---|---|
| slaFeedbackNotification | 1 | SLA measurement information |

TABLE 16C

| Data type | Cardinality | Response Code | Description |
|---|---|---|---|
| n/a | 1 | 204 NoContent | Shall be returned when the reporting is accpected. |

The data model for SLA, status and problem details may be as shown in below table 17A, 17B and 17C.

TABLE 17A

| Name | Data type | Cardinality | Description |
|---|---|---|---|
| name | String | 1 | name of sla |
| value | Number | 1 | The value set in the SLA must be an integer or real number. |

TABLE 17B

| Name | Data type | Cardinality | Description |
|---|---|---|---|
| name | ENUM | 1 | permitted value IN_PROGRESS COMPLETED FAILED |

TABLE 17C

| Name | Data type | Cardinality | Description |
|---|---|---|---|
| type | URI | 0 ... 1 | A URI reference according to IETF RFC 3986 that identifies the problem type. It is encouraged that the URI provides human-readable documentation for problem (e.g. using HTML) when dereferenced. When this member is not present, it value is assumed to be "about:blank" |
| title | String | 0 ... 1 | A short, human-readable summary of the problem type. It should not change from occurrence to occurrence of the problem. except for purposes of localization. If type is given and other than "about:blank", this attribute shall also be provided. |
| status | Integer | 1 | HTTP Response Code |
| detail | String | 1 | A human-readable explanation specific to this occurrence of the problem if the request failed |
| instance | URI | 0 ... 1 | A URI reference that identifies the specific occurrence of the problem. It may yield further information if dereferenced. |

The data model for configuration of change notification may be as shown in below table 18A and table 18B.

TABLE 18A

| Name | Data type | Cardinality | Description |
|---|---|---|---|
| notificationType | String | 1 | permitted value: ConfigurationChangeNotification |
| sliceProfileId | Identifier | 1 | Identifier of slice profile |
| configurations | List<Configuration> | 0 ... N | Transmits the changed configuration value to the list Only the changed value should be delivered (should not be included if there is no change) |

TABLE 18B

| Name | Data type | Cardinality | Description |
|---|---|---|---|
| neId | String | 1 | NE ID |
| name | String | 1 | name of configuration |
| type | ENUM | 1 | permitted value Integer Boolean Float String |
| value | Object | 1 | The value is defined according to the type. |

The data model for SLA feedback notification. SLA report and SLA value may be as shown in below Tables 19A, 19B and 19C.

TABLE 19A

| Name | Data type | Cardinality | Description |
|---|---|---|---|
| notificationType | String | 1 | permitted value: SlaFeedbackNotification |
| slas | List<SlaReport> | 0 ... N | sla performance collection value |

TABLE 19B

| Name | Data type | Cardinality | Description |
|---|---|---|---|
| name | String | 1 | name of sla |
| sliceId | Identifier | 1 | Identifier of sliceId |
| unit | String | 1 | unit of SLA |
| values | List<SlaValue> | 0 ... N | performance values |

TABLE 19C

| Name | Data type | Cardinality | Description |
|---|---|---|---|
| sst | Integer | 1 | sst of slice |
| sd | String | 1 | sd of slice |
| value | Number | 1 | The value set in the slice must be an integer or real number. |
| timestamp | Date Time | 1 | Date Time including zone information (UTC format) |

In this manner, the NSSMF may share network slicing related information (for example, slicesubnetId along with sliceProfile) with the SB blocks. Each SB block may create the relation between its xNFs and its respective NSSI (slicesubnetId). Based on which FCAPS correlation and slice-SLA feedback is generated at the SB-block level and violation is detected at NSSMF.

Thus, the present disclosure discloses the techniques to decrease the time for SLA violation detection and distributes the load to SB-blocks rather than central subnet-level NSSMF level processing.

Figure 9:
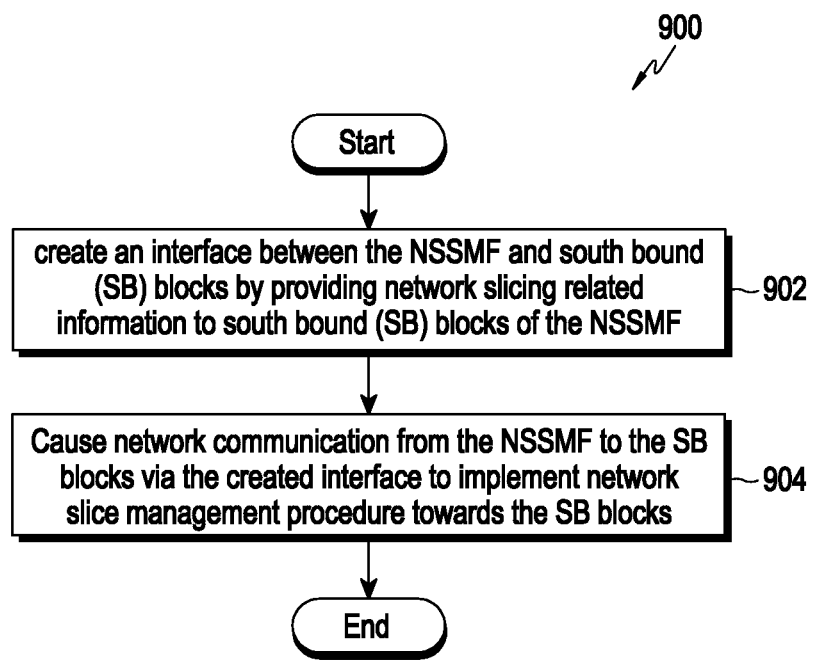
FIG. 9 is a flowchart illustrating an example method of network slice management by a network slice subnet management function (NSSMF) in a communication network according to various embodiments.

FIG. 9 is a flowchart illustrating an example method of network slice management by a network slice subnet management function (NSSMF) in a communication network according to various embodiments. It should be understood that the functionality/processing associated with method 900 (and the blocks shown in FIG. 9) can occur in a different order (for example, where at least some of the functionality/processing associated with the blocks is performed in parallel and/or in an event-driven manner).

At step 902, the method 900 recites creating an interface between the NSSMF and South Bound (SB) blocks by providing network slicing related information to the SB blocks of the NSSMF. In an embodiment, the SB blocks may comprise one or more of: Open Radio Access Network (O-RAN), Non-Real Time RAN Intelligent Controller (Non-RT RIC), Element Management System (EMS), and Management and Orchestration (MANO), but not limited thereto. In an embodiment, the network slice management procedure may include one or more of: create slice procedure, delete slice procedure, Service Level Agreement (SLA) management procedure, and notification management procedure but not limited thereto. At step 904, the method 900 causes network communication from the NSSMF to the SB blocks via the created interface to implement network slice management procedure towards the SB blocks.

In an embodiment, when the network slice management procedure is the create slice procedure, the method may comprise sending a create slice request comprising one or more of: slicesubnetId, callbackUri, authentication details, and sliceprofile to the SB block to provide the network slicing related information. The authentication details comprises an identifier and a password to receive token from the NSSMF. The sliceprofile comprises an identifier of slice profile and a list of PLMNInfo data type.

In an embodiment, when the network slice management procedure is the delete slice procedure to delete a slice, the method comprises sending a delete slice request comprising a slice identifier (sliceId) of the slice to be deleted to the SB block, for providing the network slicing related information.

In an embodiment, when the network slice management procedure is the SLA management procedure, the method may comprise sending at least one of: sliceProfileId, a list of SLA configurations, a list of target NR Cell Global Identifier (NGCIs), name of SLA to the SB block, for providing the network slicing related information. The SLA management procedure may comprise one or more of: configure SLA, de-configure SLA, obtain individual SLA Configuration, list all SLA Configuration, update all SLA Configuration, Update Specific SLA Configuration, and obtain status of Configuration Request. When the network slice management procedure is the notification management procedure may comprise receiving at least one of: changed configuration information and SLA measurement information from the SB block. Such method of interfacing decreases the time for SLA violation detection and distributes the load to SB-blocks rather than central subnet-level NSSMF level processing.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the detailed description, including the appended claims.

The order in which the various operations of the methods are described is not intended to be construed as a limitation, and any number of the described method blocks can be combined in any order to implement the method. Additionally, individual blocks may be deleted from the methods without departing from the spirit and scope of the subject matter described herein. Furthermore, the methods can be implemented in any suitable hardware, software, firmware, or combination thereof.

It may be noted here that the subject matter of some or all embodiments described with reference to the figures may be relevant for the methods and the same is not repeated for the sake of brevity.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in Figures, those operations may be performed by any suitable corresponding counterpart means-plus-function components.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with various embodiments described herein. The term "computer-readable medium" should be understood to include tangible items and exclude carrier waves and transient signals, e.g., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Certain aspects may comprise a computer program product for performing the operations presented herein. For example, such a computer program product may comprise a computer readable media having instructions stored (and/or encoded) thereon, the instructions being executable by one or more processors to perform the operations described herein. For certain aspects, the computer program product may include packaging material.

Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

As used herein, a phrase referring to "at least one" or "one or more" of a list of items refers to any combination of those items, including single members. As an example, "at least one of: a, b, or c" is intended to cover: a, b, c, a-b, a-c, b-c, and a-b-c. The terms "a", "an" and "the" may refer, for example, to "one or more", unless expressly specified otherwise. The terms "including", "comprising", "having" and variations thereof, when used in a claim, is used in a non-exclusive sense that is not intended to exclude the presence of other elements or steps in a claimed structure or method, unless expressly specified otherwise.

The language used in the disclosure has been principally selected for readability and instructional purposes, and it may not have been selected to delineate or circumscribe the disclosed subject matter. It is therefore intended that the scope of the disclosure be limited not by this detailed description. Accordingly, the embodiments of the present disclosure are intended to be illustrative, not limiting, of the scope of the disclosure, including the appended claims and their equivalents. It will also be understood that any of the embodiment(s) described herein may be used in conjunction with any other embodiment(s) described herein.

What is claimed is:

1. A method of network slice management by a network slice subnet management function (NSSMF) in a communication network, the method comprising:
providing network slicing related information to South Bound (SB) blocks of the NSSMF to establish an interface between the NSSMF and the SB blocks; and
performing network slice management procedure towards the SB blocks through communication between the NSSMF and the SB blocks via the established interface,
wherein in a case that the network slice management procedure is a create slice procedure, the network slicing related information comprises an identifier and a password to receive token from the NSSMF.

2. The method of claim 1, wherein the SB blocks comprise one or more of Open Radio Access Network (O-RAN), Non-Real Time RAN Intelligent Controller (Non-RT RIC), Element Management System (EMS), Management and Orchestration (MANO), or a sub-NSSMF.

3. The method of claim 1, wherein the network slice management procedure includes one or more of the create slice procedure, delete slice procedure, Service Level Agreement (SLA) management procedure, or notification management procedure.

4. The method of claim 3, wherein, based on the network slice management procedure being the create slice procedure, providing the network slicing related information comprises:
sending a create slice request comprising one or more of slicesubnetId, callbackUri, authentication details, or sliceprofile to the SB blocks,
wherein the authentication details comprise the identifier and the password to receive the token from the NSSMF, and
wherein the sliceprofile comprises an identifier of slice profile and a list of PLMNInfo data type.

5. The method of claim 3, wherein, based on the network slice management procedure being the delete slice procedure to delete a slice, providing the network slicing related information comprises:
sending a delete slice request comprising a slice identifier (sliceId) of the slice to be deleted to the SB block.

6. The method of claim 3, wherein, based on the network slice management procedure being the SLA management procedure, providing the network slicing related information comprises:
sending at least one of sliceProfileId, a list of SLA configurations, a list of target NR Cell Global Identifier (NGCIs), or name of SLA to the SB block.

7. The method of claim 6, wherein the SLA management procedure comprises one or more of configure SLA, de-configure SLA, obtain individual SLA Configuration, list all SLA Configuration, update all SLA Configuration, Update Specific SLA Configuration, or obtain status of Configuration Request.

8. The method of claim 3, wherein, based on the network slice management procedure being the notification management procedure, the method comprises:
receiving at least one of changed configuration information or SLA measurement information from the SB block.

9. An apparatus for a network slice subnet management function (NSSMF) in a communication network comprising:
at least one processor, comprising processing circuitry; and
memory storing instructions to be executed by at least one processor, wherein the instructions, when executed by the at least one processor, cause the apparatus to perform operations comprising:
providing network slicing related information to South Bound (SB) blocks of the NSSMF to establish an interface between the NSSMF and the SB blocks, and
performing network slice management procedure towards the SB blocks through communication between the NSSMF and the SB blocks via the established interface,
wherein in a case that the network slice management procedure is a create slice procedure, the network slicing related information comprises an identifier and a password to receive token from the NSSMF.

10. The apparatus of claim 9, wherein the SB blocks comprise one or more of Open Radio Access Network (O-RAN), Non-RealTime RAN Intelligent Controller (Non-RT RIC), Element Management System (EMS), Management and Orchestration (MANO), or a sub-NSSMF.

11. The apparatus of claim 9, wherein the network slice management procedure includes one or more of the create slice procedure, delete slice procedure, Service Level Agreement (SLA) management procedure, or notification management procedure.

12. The apparatus of claim 11, wherein, based on the network slice management procedure being the create slice procedure, providing the network slicing related information comprises:
sending a create slice request comprising one or more of slicesubnetId, callbackUri, authentication details, or sliceprofile to the SB block,
wherein the authentication details comprise the identifier and the password to receive the token from the NSSMF, and wherein the sliceprofile comprises an identifier of slice profile and a list of PLMNInfo data type.

13. The apparatus of claim 11, wherein, based on the network slice management procedure being the delete slice procedure to delete a slice, providing the network slicing related information comprises:
sending a delete slice request comprising a slice identifier (sliceId) of the slice to be deleted to the SB block.

14. The apparatus of claim 11, wherein, based on the network slice management procedure being the SLA management procedure, providing the network slicing related information comprises:
sending at least one of sliceProfileId, a list of SLA configurations, a list of target NR Cell Global Identifier (NGCIs), or name of SLA to the SB block.

15. The apparatus of claim 14, wherein the SLA management procedure comprises one or more of configure SLA, De-configure SLA, obtain individual SLA Configuration, list all SLA Configuration, update all SLA Configuration, Update Specific SLA Configuration, or obtain status of Configuration Request.

16. The apparatus of claim 11, wherein, based on the network slice management procedure being the notification management procedure, at least one processor, individually and/or collectively, is configured to cause the apparatus to:
receive at least one of changed configuration information or SLA measurement information from the SB block.

17. A non-transitory computer-readable storage medium storing instructions which, when executed by at least one processor of an apparatus for a network slice subnet management function (NSSMF) in a communication network, cause the apparatus to perform operations comprising:
providing network slicing related information to South Bound (SB) blocks of the NSSMF to establish an interface between the NSSMF and the SB blocks; and
performing network slice management procedure towards the SB blocks through communication between the NSSMF and the SB blocks via the established interface,
wherein in a case that the network slice management procedure is a create slice procedure, the network slicing related information comprises an identifier and a password to receive token from the NSSMF.

18. The non-transitory computer-readable storage medium of claim 17, wherein the network slice management procedure includes one or more of the create slice procedure, delete slice procedure, Service Level Agreement (SLA) management procedure, or notification management procedure.

19. The non-transitory computer-readable storage medium of claim 18, wherein, based on the network slice management procedure being the create slice procedure, providing the network slicing related information comprises:
sending a create slice request comprising one or more of slicesubnetId, callbackUri, authentication details, or sliceprofile to the SB block,
wherein the authentication details comprise the identifier and the password to receive the token from the NSSMF, and
wherein the sliceprofile comprises an identifier of slice profile and a list of PLMNInfo data type.

20. The non-transitory computer-readable storage medium of claim 18, wherein, based on the network slice management procedure being the delete slice procedure to delete a slice, providing the network slicing related information comprises:
sending a delete slice request comprising a slice identifier (sliceId) of the slice to be deleted to the SB block.

* * * * *